(12) United States Patent
Ta et al.

(10) Patent No.: US 11,954,334 B2
(45) Date of Patent: Apr. 9, 2024

(54) BACK-TO-BACK POWER LOSS PROTECTION

(71) Applicant: Western Digital Technologies, Inc., San Jose, CA (US)

(72) Inventors: Thomas Tam Ta, San Jose, CA (US); Oleg Kragel, San Jose, CA (US); Yosief Ataklti, Fremont, CA (US); Kwangyoung Lee, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 120 days.

(21) Appl. No.: 17/731,762

(22) Filed: Apr. 28, 2022

(65) Prior Publication Data

US 2023/0350575 A1 Nov. 2, 2023

(51) Int. Cl.
*G06F 3/06* (2006.01)
*G06F 1/30* (2006.01)

(52) U.S. Cl.
CPC .............. *G06F 3/0619* (2013.01); *G06F 1/30* (2013.01); *G06F 3/0656* (2013.01); *G06F 3/0659* (2013.01); *G06F 3/0673* (2013.01)

(58) Field of Classification Search
CPC ............ G06F 1/08; G06F 1/3203; G06F 1/263
See application file for complete search history.

(56) References Cited

U.S. PATENT DOCUMENTS 8,380,999 B1 * 2/2013 Robison ............ H04W 52/0274
320/120

* cited by examiner

*Primary Examiner* — Yong J Choe
(74) *Attorney, Agent, or Firm* — PATTERSON + SHERIDAN, LLP

(57) ABSTRACT

The present disclosure generally relates to increasing data storage device lifetime by detecting synthetic PLP tests. Both upper and lower PLP time thresholds are set. When the PLP time is above the upper threshold, the data storage device is in a defensive PLP idle state. When the PLP time is between the upper and lower thresholds, the data storage device is in a defensive PLP detecting state. When the PLP time is below the lower threshold, the data storage device may enter the defensive PLP state if the number of times the PLP time is below the lower PLP time threshold either a consecutive number of times or a set number of times within a predefined window of time. While in the defensive PLP state, mounting is not completed and hence, a host device will not send any I/O commands and thus, not waste a PEC count.

20 Claims, 7 Drawing Sheets

BACK-TO-BACK POWER LOSS PROTECTION

BACKGROUND OF THE DISCLOSURE

Field of the Disclosure

Embodiments of the present disclosure generally relate to increasing data storage device lifetime by detecting synthetic power loss protection (PLP) tests.

Description of the Related Art

Advanced solid state drives (SSDs) are typically equipped with a set of capacitors that are used to supply power to the SSD momentarily when the SSD is cut off from an external power supply. Firmware (FW) on the SSD will use the power stored in the capacitors to flush out pending user data to a permanent medium of the SSD, which is typically non-volatile memory (NVM) such as NAND. The FW will also save the SSD internal data to the NVM in such a way that the SSD can boot up at the same state/status as when the power drained from the capacitors. The process is referred to as a power loss protection (PLP) plan.

The NVM also has a finite program/erase cycle (PEC) count for the lifetime of the block. There are some synthetic test programs that constantly cut off the external power supply in a very short period of time. If the power cut off time is shorter than the required programming time of a block, then a PEC count is wasted for a planned power outage, which shortens the data storage device lifetime.

Therefore, there is a need in the art for detecting when the data storage device encounters a synthetic PLP test. There is also a need in the art for preventing the data storage device from losing unnecessary PEC counts and thus enhance the lifetime of the data storage device.

SUMMARY OF THE DISCLOSURE

The present disclosure generally relates to increasing data storage device lifetime by detecting synthetic power loss protection (PLP) tests. Both upper and lower PLP time thresholds are set. When the PLP time is above the upper PLP time threshold, the data storage device is in a defensive PLP idle state. When the PLP time is between the upper and lower PLP time thresholds, the data storage device is in a defensive PLP detecting state. When the PLP time is below the lower PLP time threshold, the data storage device may enter the defensive PLP state if the number of times the PLP time is below the lower PLP time threshold is either a consecutive number of times or a set number of times within a predefined window of time. While in the defensive PLP state, mounting is not completed and hence, a host device will not send any input/output (I/O) commands and thus, not waste a program/erase cycle (PEC) count. Mounting refers to a process performed in FW when a data storage device is powered on. The mount process restores the internal states of the data storage device like the data storage device was before being powered off. The FW only informs the host device that the data storage device is ready for input/output (I/O) commands if the mount process is completed.

In one embodiment, a data storage device comprises a memory device and a controller coupled to the memory device. The controller is configured to: set an upper back-to-back (B2B) power loss prevention (PLP) time threshold; set a lower B2B PLP time threshold; and enter a defensive PLP detecting mode. During the defensive PLP detecting mode the controller is configured to: determine that PLP time is below the lower B2B PLP time threshold; and track a number of consecutive times that the PLP time is below the lower B2B PLP time threshold with a lower threshold tracker; and enter defensive PLP mode when the number of consecutive times is equal to a predetermined number.

In another embodiment, a data storage device comprises a memory device and a controller coupled to the memory device. The controller is configured to: set an upper back-to-back (B2B) power loss prevention (PLP) time threshold; set a lower B2B PLP time threshold; and enter a defensive PLP detecting mode. During the defensive PLP detecting mode the controller is configured to: determine that PLP time is below the lower B2B PLP time threshold; and track a number of times that the PLP time is below the lower B2B PLP time threshold with a lower threshold tracker; and enter the defensive PLP mode when the number of times is equal to a first number of times out of a second number of times, wherein the first number of times is less than the second number of times.

In another embodiment, a data storage device comprises: memory means; and a controller coupled to the memory means, wherein the controller is configured to: detect entry into a synthetic power loss prevention (PLP) test; track a PLP time; compare the PLP time to a lower back-to-back (B2B) PLP time threshold and an upper B2B PLP time threshold; switch between a defensive PLP idle state, a defensive PLP detecting state, and a defensive PLP state; and withhold completion of a mount process while in the defensive PLP state.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specifically described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to increasing data storage device lifetime by detecting synthetic power loss protection (PLP) tests. Both upper and lower PLP time thresholds are set. When the PLP time is above the upper PLP time threshold, the data storage device is in a defensive PLP idle state. When the PLP time is between the upper and lower PLP time thresholds, the data storage device is in a defensive PLP detecting state. When the PLP time is below the lower PLP time threshold, the data storage device may enter the defensive PLP state if the number of times the PLP time is below the lower PLP time threshold either a consecutive number of times or a set number of times within a predefined window of time. While in the defensive PLP state, mounting is not completed and hence, a host device will not send any input/output (I/O) commands and thus, not waste a program/erase cycle (PEC) count. As previously noted, mounting refers to the process of restoring the storage device to the state it was in before the power loss.

Figure 1:
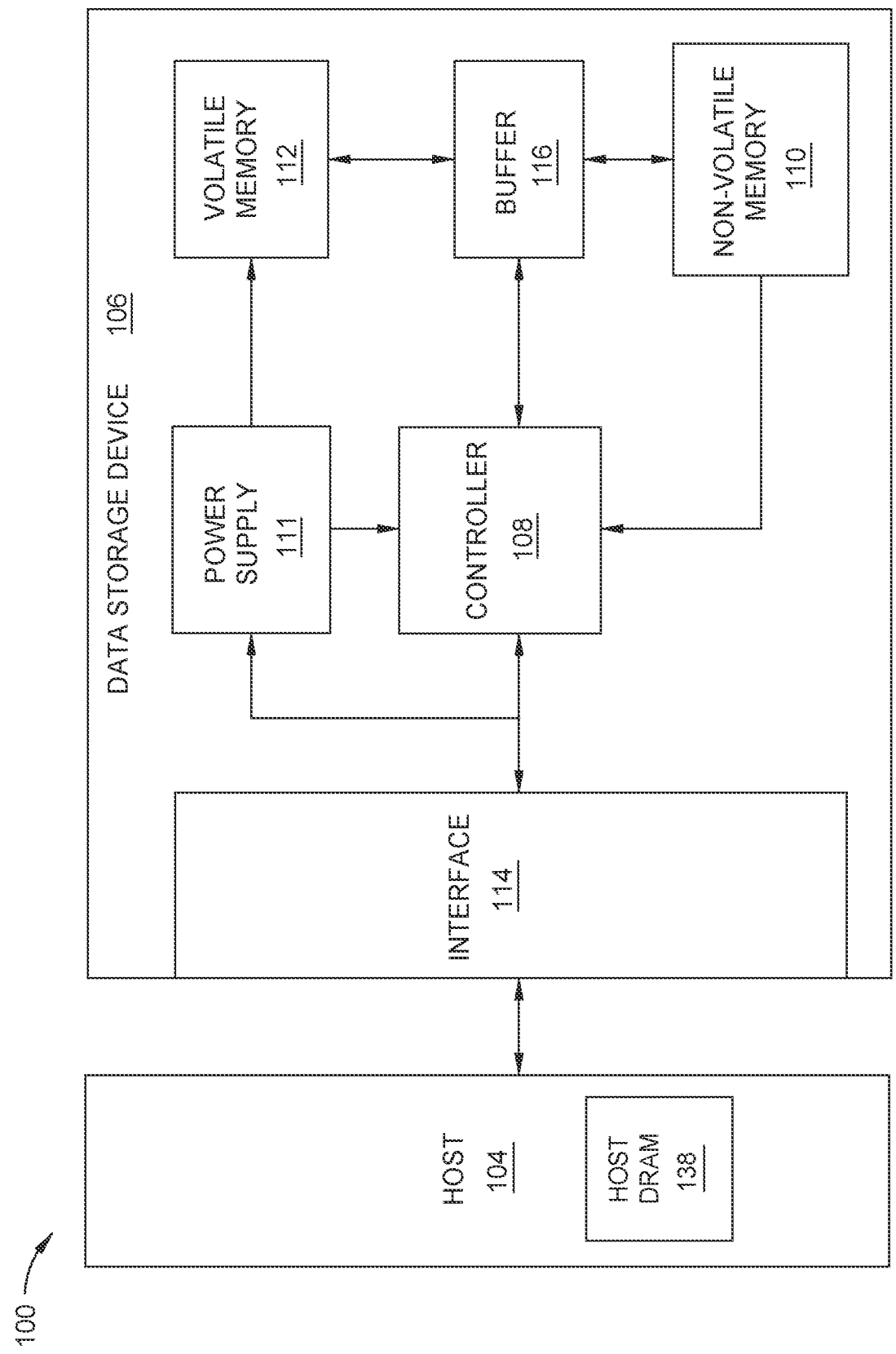
FIG. 1 is a schematic block diagram illustrating a storage system in which a data storage device may function as a storage device for a host device, according to certain embodiments.

FIG. 1 is a schematic block diagram illustrating a storage system 100 having a data storage device 106 that may function as a storage device for a host device 104, according to certain embodiments. For instance, the host device 104 may utilize a non-volatile memory (NVM) 110 included in data storage device 106 to store and retrieve data. The host device 104 comprises a host DRAM 138. In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104. The storage system 100 may be an enterprise storage system or a client storage system. Both the enterprise storage system and the client storage system includes one or more data storage devices, where the enterprise storage system includes greater than or equal to a threshold number of data storage devices and the client storage system includes less than the threshold number of data storage devices.

The host device 104 may store and/or retrieve data to and/or from one or more storage devices, such as the data storage device 106. As illustrated in FIG. 1, the host device 104 may communicate with the data storage device 106 via an interface 114. The host device 104 may comprise any of a wide range of devices, including computer servers, network-attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or other devices capable of sending or receiving data from a data storage device.

The data storage device 106 includes a controller 108, NVM 110, a power supply 111, volatile memory 112, the interface 114, and a write buffer 116. In some examples, the data storage device 106 may include additional components not shown in FIG. 1 for the sake of clarity. For example, the data storage device 106 may include a printed circuit board (PCB) to which components of the data storage device 106 are mechanically attached and which includes electrically conductive traces that electrically interconnect components of the data storage device 106 or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe x1, x4, x8, x16, PCIe Mini Card, MiniPCI, etc.). In some examples, the data storage device 106 may be directly coupled (e.g., directly soldered or plugged into a connector) to a motherboard of the host device 104.

Interface 114 may include one or both of a data bus for exchanging data with the host device 104 and a control bus for exchanging commands with the host device 104. Interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like. Interface 114 (e.g., the data bus, the control bus, or both) is electrically connected to the controller 108, providing an electrical connection between the host device 104 and the controller 108, allowing data to be exchanged between the host device 104 and the controller 108. In some examples, the electrical connection of interface 114 may also permit the data storage device 106 to receive power from the host device 104. For example, as illustrated in FIG. 1, the power supply 111 may receive power from the host device 104 via interface 114.

The NVM 110 may include a plurality of memory devices or memory units. NVM 110 may be configured to store and/or retrieve data. For instance, a memory unit of NVM 110 may receive data and a message from controller 108 that instructs the memory unit to store the data. Similarly, the memory unit may receive a message from controller 108 that instructs the memory unit to retrieve data. In some examples, each of the memory units may be referred to as a die. In some examples, the NVM 110 may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit may include any type of non-volatile memory devices, such as flash memory devices, phase-change memory (PCM) devices, resistive random-access memory (ReRAM) devices, magneto-resistive random-access memory (MRAM) devices, ferroelectric random-access memory (F-RAM), holographic memory devices, and any other type of non-volatile memory devices.

The NVM 110 may comprise a plurality of flash memory devices or memory units. NVM Flash memory devices may include NAND or NOR-based flash memory devices and may store data based on a charge contained in a floating gate of a transistor for each flash memory cell. In NVM flash memory devices, the flash memory device may be divided into a plurality of dies, where each die of the plurality of dies includes a plurality of physical or logical blocks, which may be further divided into a plurality of pages. Each block of the plurality of blocks within a particular memory device may include a plurality of NVM cells. Rows of NVM cells may be electrically connected using a word line to define a page of a plurality of pages. Respective cells in each of the plurality of pages may be electrically connected to respective bit lines. Furthermore, NVM flash memory devices may be 2D or 3D devices and may be single level cell (SLC), multi-level cell (MLC), triple level cell (TLC), or quad level cell (QLC). The controller 108 may write data to and read data from NVM flash memory devices at the page level and erase data from NVM flash memory devices at the block level.

The power supply 111 may provide power to one or more components of the data storage device 106. When operating in a standard mode, the power supply 111 may provide power to one or more components using power provided by an external device, such as the host device 104. For instance, the power supply 111 may provide power to the one or more components using power received from the host device 104 via interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, super-capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The volatile memory 112 may be used by controller 108 to store information. Volatile memory 112 may include one or more volatile memory devices. In some examples, controller 108 may use volatile memory 112 as a cache. For instance, controller 108 may store cached information in volatile memory 112 until the cached information is written to the NVM 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)).

Controller 108 may manage one or more operations of the data storage device 106. For instance, controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. Controller 108 may determine at least one operational characteristic of the storage system 100 and store at least one operational characteristic in the NVM 110. In some embodiments, when the data storage device 106 receives a write command from the host device 104, the controller 108 temporarily stores the data associated with the write command in the internal memory or write buffer 116 before sending the data to the NVM 110.

Figure 2:
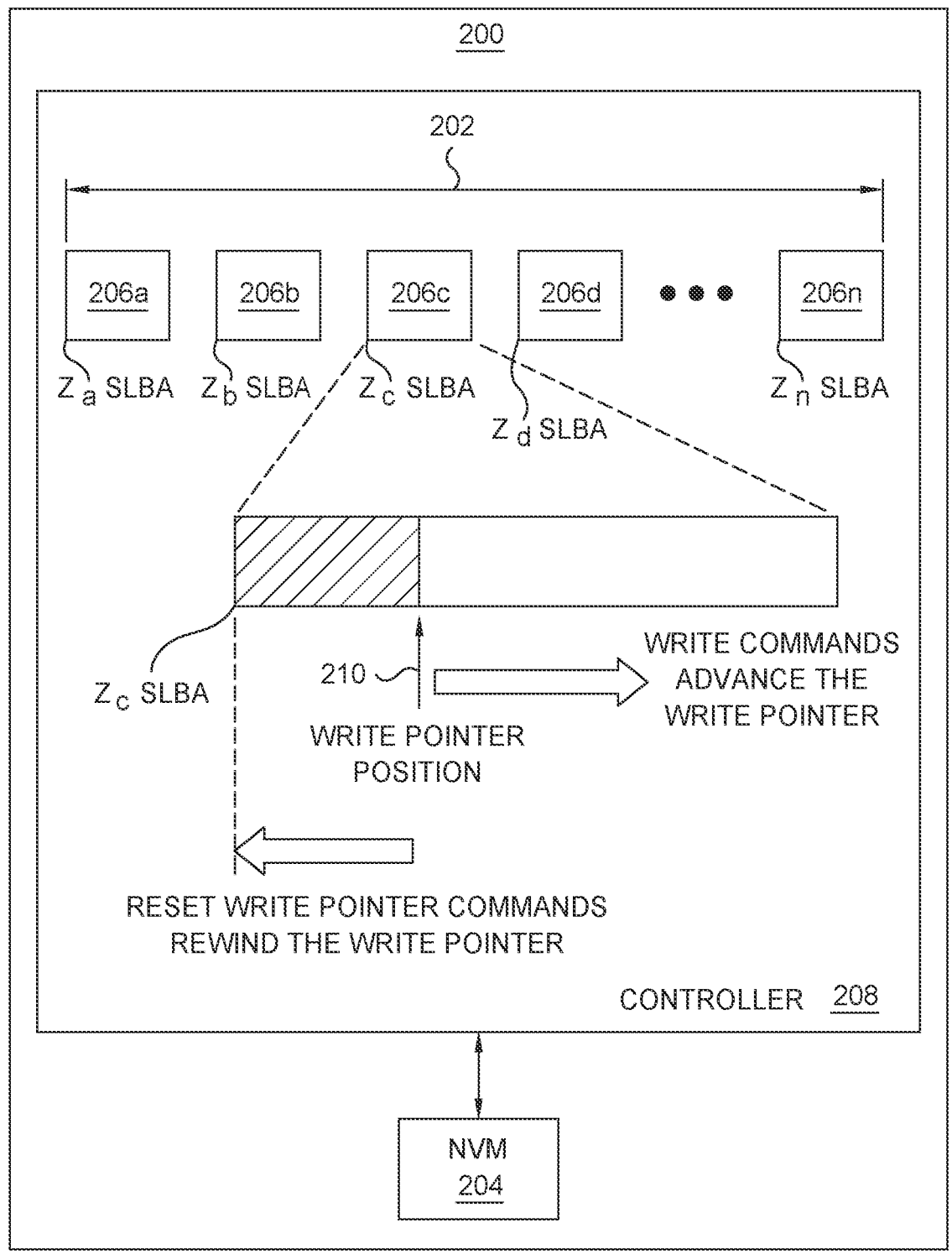
FIG. 2 is an exemplary illustration of a zoned namespace utilized in a storage device, according to certain embodiments.

One type of data storage device is a zoned namespace (ZNS) data storage device. FIG. 2 is an exemplary illustration of a ZNS view utilized in a data storage device 200, according to certain embodiments. The data storage device 200 may present the ZNS 202 view to a host device, such as the host device 104 of FIG. 1. The data storage device 200 may be the data storage device 106 of the storage system 100 of FIG. 1. The data storage device 200 may have one or more ZNS 202, and each ZNS 202 may be different sizes. The data storage device 200 may further comprise one or more conventional namespaces in addition to the one or more Zoned Namespaces 202. Moreover, the ZNS 202 may be a zoned block command (ZBC) for SAS and/or a zoned-device ATA command set (ZAC) for SATA. Host side zone activity may be more directly related to media activity in zoned drives due to the relationship of logical to physical activity possible.

In the data storage device 200, the ZNS 202 is the quantity of NVM that can be formatted into logical blocks such that the capacity is divided into a plurality of zones 206a-206n (collectively referred to as zones 206). The NVM may be the storage unit or NVM 110 of FIG. 1. Each of the zones 206 comprise a plurality of physical or erase blocks (not shown) of a memory unit or NVM 204, and each of the erase blocks are associated a plurality of logical blocks (not shown). Each of the zones 206 may have a size aligned to the capacity of one or more erase blocks of a NVM or NAND device. When the controller 208 receives a command, such as from a host device (not shown) or the submission queue of a host device, the controller 208 can read data from and write data to the plurality of logical blocks associated with the plurality of erase blocks (EBs) of the ZNS 202. Each of the logical blocks is associated with a unique LBA or sector.

When data is written to an erase block, one or more logical blocks are correspondingly updated within a zone 206 to track where the data is located within the NVM 204. Data may be written to one zone 206 at a time until a zone 206 is full, or to multiple zones 206 such that multiple zones 206 may be partially full. Similarly, when writing data to a particular zone 206, data may be written to the plurality of erase blocks one block at a time, in sequential order of NAND locations, page-by-page, or wordline-by-wordline, until moving to an adjacent block (i.e., write to a first erase block until the first erase block is full before moving to the second erase block), or to multiple blocks at once, in sequential order of NAND locations, page-by-page, or wordline-by-wordline, to partially fill each block in a parallel fashion (i.e., writing the first NAND location or page of each erase block before writing to the second NAND location or page of each erase block). This sequential programming of every NAND location is a typical non-limiting requirement of many NAND EBs.

Each of the zones 206 is associated with a zone starting logical block address (ZSLBA) or zone starting sector. The ZSLBA is the first available LBA in the zone 206. For example, the first zone 206a is associated with $Z_a$SLBA, the second zone 206b is associated with $Z_b$SLBA, the third zone 206c is associated with $Z_c$SLBA, the fourth zone 206d is associated with $Z_d$SLBA, and the $n^{th}$ zone 206n (i.e., the last zone) is associated with $Z_n$SLBA. Each zone 206 is identified by its ZSLBA, and is configured to receive sequential writes (i.e., writing data to the NVM 110 in the order the write commands are received).

As data is written to a zone 206, a write pointer 210 is advanced or updated to point to or to indicate the next available block in the zone 206 to write data to in order to track the next write starting point (i.e., the completion point of the prior write equals the starting point of a subsequent write). Thus, the write pointer 210 indicates where the subsequent write to the zone 206 will begin. Subsequent write commands are 'zone append' commands, where the data associated with the subsequent write command appends to the zone 206 at the location the write pointer 210 is indicating as the next starting point. An ordered list of LBAs within the zone 206 may be stored for write ordering. Each zone 206 may have its own write pointer 210. Thus, when a write command is received, a zone is identified by its ZSLBA, and the write pointer 210 determines where the write of the data begins within the identified zone.

In a ZNS environment, or other environments, high PECs lead to shorter device lifetimes. Undetected synthetic back-to-back (B2B) PLPs, which are tests that purposefully turn on and off a data storage device repeatedly in a short period of time, lead to higher PECs. The time duration that the data storage device is powered on and powered off is referred to as a power cycle (PC) while the time from the data storage device is powered on until the data storage device is powered off is referred to as the PLP time. As discussed herein, detecting the synthetic B2B PLP tests will save PECs and improve data storage device lifetime.

On manner of detecting the B2B PLP test is to set both an upper B2B PLP threshold (Tup) and a lower B2B PLP threshold (Tlw). Tup is the PLP time that is suspiciously from a synthetic B2B PLP, which may be about 30 seconds in a ZNS environment. Tlw is the PLP time that is too short to be a normal user case which indicates a likely synthetic B2B PLP event, which, for some devices, may be about 6 seconds in a ZNS environment.

When a data storage device is powered on, the FW of the data storage device will go through a mount process that restores the internal states of the data storage device like the data storage device was before being powered off. The FW only informs the host device that the data storage device is ready for input/output (I/O) commands if the mount process is finished. During the mount process, it is contemplated to try and detect if the data storage device is facing a synthetic B2B PLP test.

To detect the synthetic B2B PLP test, the data storage device has three states: defensive PLP idle state, defensive PLP detecting state, and defensive PLP state. The defensive PLP idle state is the state when a PLP time is greater than Tup. The defensive PLP detecting state is whenever the PLP time is less than or equal to Tup.

Once in the defensive PLP detecting state, any subsequent PLP test time is collected. If there is a PLP time that is greater than Tup, the state shifts back to the defensive PLP idle state. If the PLP test time collected during the defensive PLP detecting state meets certain criteria, the defensive PLP state is entered. One such criteria is an aggressive defensive count threshold where the number of consecutive times (e.g. 3) that the PLP time is less than Tlw is tracked. If the number of consecutive times the PLP time is below Tlw meets the threshold, then the data storage device enters the defensive PLP state. Another criteria is where the PLP time is less than Tlw for N (e.g., 5) times out of M (e.g., 9) times where M is consecutive times below Tup.

Figure 3:
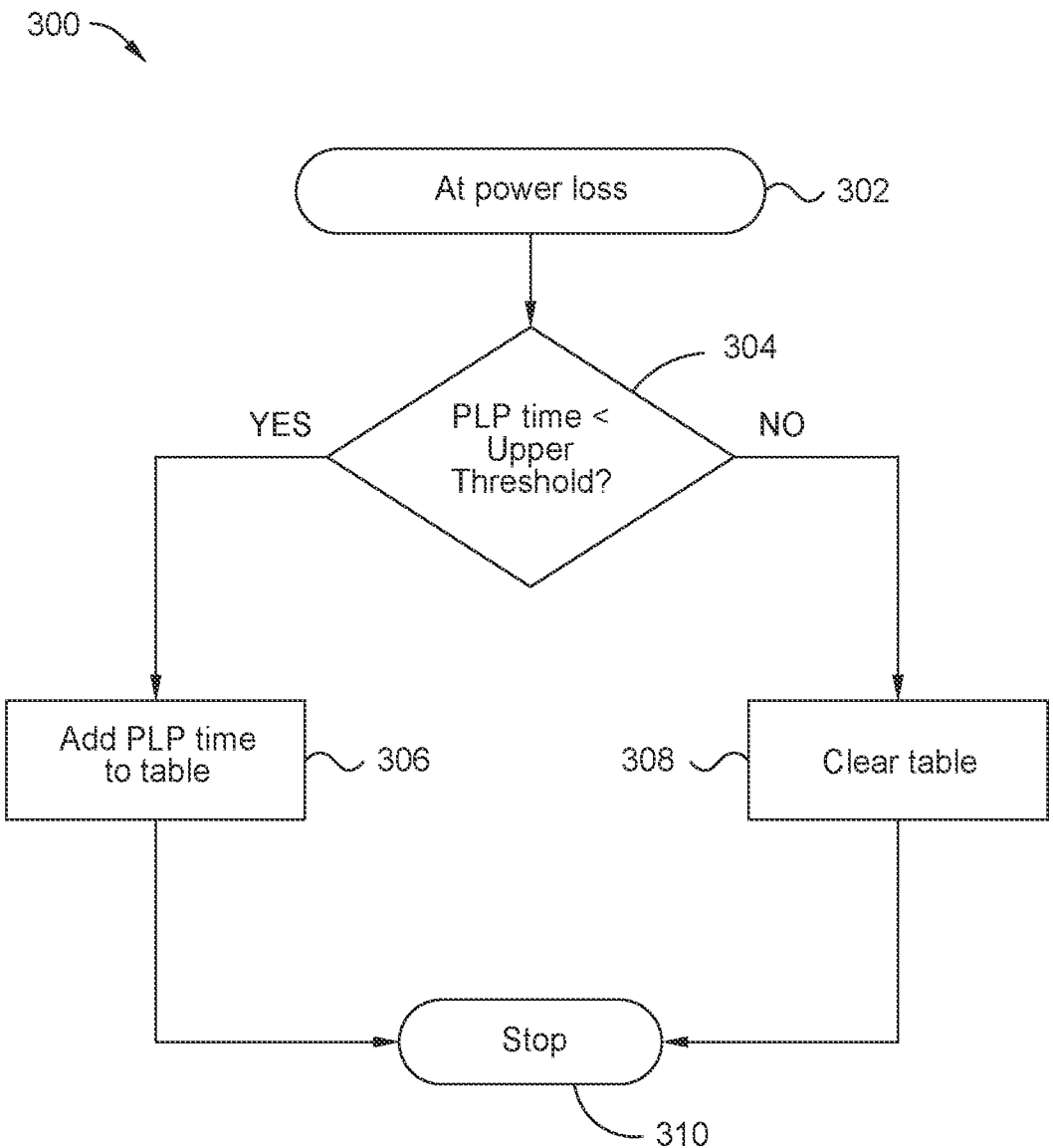
FIG. 3 is a flowchart illustrating processing of a power loss event according to one embodiment.

FIG. 3 is a flowchart 300 illustrating processing of a power loss event according to one embodiment. At 302, a power loss event is detected. A determination is made at 304 regarding whether the PLP time is less than Tup. If the PLP time is equal to or greater than Tup, then the table is cleared at 308 and the process stops at 310. If the PLP time is less than Tup, then the PLP time is added to a table at 306. The table keeps track of PC, PLP time, and the action that occurs. Table I below is an example.

TABLE I

| PC | PLP time | What happens | Action |
| --- | --- | --- | --- |
| 1 | 25 seconds | Less than Tup | Defensive PLP detecting phase begins Tdef = 1 Tdef-low = 0 |
| 2 | 3 seconds | Less than Tlw | Tdef = 2 Tdef-low = 1 |
| 3 | 7 seconds | Less than Tup, but greater than Tlw | Tdef = 3 Tdef-low = 1 |
| 4 | 20 seconds | Less than Tup, but greater than Tlw | Tdef = 4 Tdef-low = 1 |
| 5 | 31 seconds | Greater than Tup | Return to Defensive PLP idle phase |

Table I is an example of a non-defensive PLP case where Tup=30 and Tlw=6. Initially, the data storage device operates in the defensive PLP idle phase, but at PC 1, there is a PLP time recorded that is less than Tup, but greater than Tlw. Hence, the data storage device enters the defensive PLP detecting phase. The defensive PLP detecting phase counter (Tdef) moves to 1 from 0. The defensive PLP detecting phase Tlw counter (Tdef-low) remains at 0. At PC 2, there is a PLP time that is below both Tup and Tlw. Hence, Tdef moves to 2 and Tdef-low moves to 1. At PC 3, there is a PLP time that is below Tup yet above Tlw. Hence, Tdef moves to 3 while Tdef-low remains unchanged at 1. Similarly, at PC 4, there is a PLP time that is below Tup yet above Tlw and therefore Tdef moves to 4 while Tdef-low remains at 1. At PC 5, the PLP time is above Tup and hence, the data storage device exits the defensive PLP detection phase and enters the defensive PLP idle phase and both Tdef and Tdef-low reset to 0.

Figure 4:
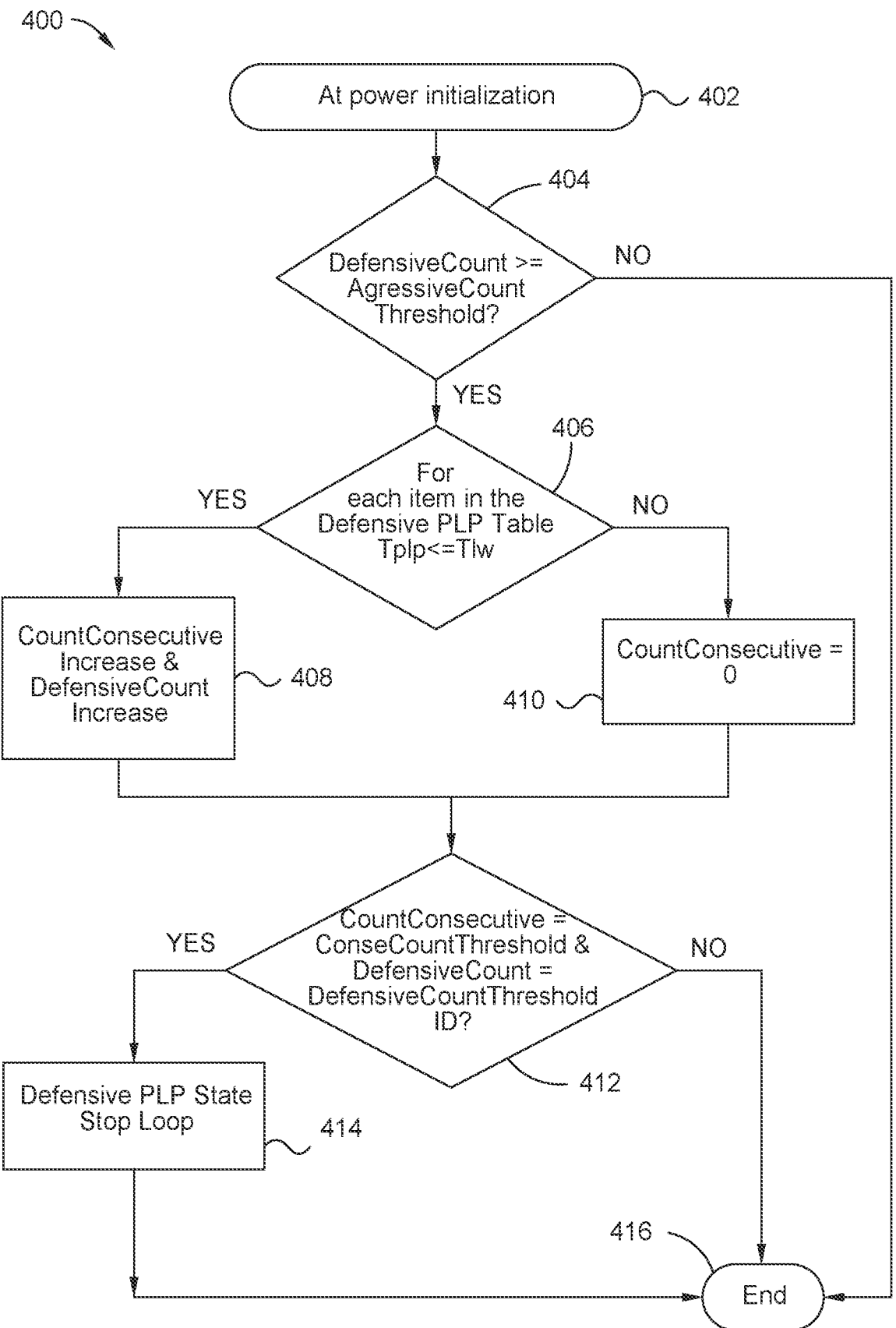
FIG. 4 is a flowchart illustrating processing of a power loss event according to another embodiment.

FIG. 4 is a flowchart 400 illustrating processing of a power loss event according to another embodiment. At 402, power is initialized and a determination is made at 404 regarding whether the count in the defensive PLP detection state (i.e., DefensiveCount) is greater than or equal to an aggressive count threshold (i.e., AggressiveCountThreshold), which is 3 in the example above. If the defensive PLP detection state count is less than the aggressive count threshold, then the process ends at 416. However, if the defensive PLP detection state count is equal to or greater than the aggressive count threshold, then at 406, for each item in the defensive PLP table, a determination is made regarding whether the PLP time (Tplp) is less than or equal to Tlw. If Tplp is greater than Tlw, then the count of consecutive Tplp (i.e., CountConsecutive) is set to 0 at 410. If Tplp is less than or equal to Tlw at 406, then the count of consecutive Tplp (i.e., CountConsecutive) is increased by 1 and the count in the defensive PLP detection state (i.e., DefensiveCount) is increased by 1 as well at 408. A determination is then made at 412 regarding whether the count of consecutive Tplp (i.e., CountConsecutive) is equal to the consecutive count threshold (i.e., ConseCountThreshold) and whether the count in the defensive PLP detection state (i.e., DefensiveCount) is equal to the defensive count threshold (i.e., DefensiveCountThreshold). If no at 412, then the process ends at 416. If yes at 412, then the defensive PLP state stop loop begins at 414 and the process ends at 416.

Table II illustrates an example of obtaining 3 consecutive PLP times below Tlw.

TABLE II

| PC | PLP time | What happens | Action |
|---|---|---|---|
| 1 | 25 seconds | Less than Tup | Defensive PLP detection date entered Tdef = 1 Tdef-low = 0 |
| 2 | 3 seconds | Less than Tlw | Tdef = 2 Tdef-low = 1 |
| 3 | 4 seconds | Less than Tlw | Tdef = 3 Tdef-low = 2 |
| 4 | 4 seconds | Less than Tlw | Tdef = 4 Tdef-low = 3 Enter Defensive PLP state |

Table II is an example of a non-defensive PLP case where Tup=30 and Tlw=6. Initially, the data storage device operates in the defensive PLP idle phase, but at PC 1, there is a PLP time recorded that is less than Tup, but greater than Tlw. Hence, the data storage device enters the defensive PLP detecting phase. Tdef moves to 1 from 0 while Tdef-low remains at 0. At PC 2, there is a PLP time that is below both Tup and Tlw. Hence, Tdef moves to 2 and Tdef-low moves to 1. At PC 3, there is a PLP time that is below Tup and Tlw. Hence, Tdef moves to 3 while Tdef-low moves to 2. Similarly, at PC 4, there is a PLP time that is below Tup and Tlw and therefore Tdef moves to 4 while Tdef-low moves to 3. Because Table II is set for an aggressive consecutive below Tlw threshold of 3, the data storage device enters the defensive PLP state. It is to be understood that the number 3 is for exemplification purposes and that other numbers are contemplated.

Table III is an example of obtaining N (e.g., 5) PLP times below Tlw out of M (e.g., 9) PLP times below Tup.

TABLE III

| PC | PLP time | What happens | Action |
|---|---|---|---|
| 1 | 25 seconds | Less than Tup | Defensive PLP detection date entered Tdef = 1 Tdef-low = 0 |
| 2 | 3 seconds | Less than Tlw | Tdef = 2 Tdef-low = 1 |
| 3 | 5 seconds | Less than Tlw | Tdef = 3 Tdef-low = 2 |
| 4 | 20 seconds | Less than Tup but greater than Tlw | Tdef = 4 Tdef-low = 2 |
| 5 | 4 seconds | Less than Tlw | Tdef = 5 Tdef-low = 3 |
| 6 | 5 seconds | Less than Tlw | Tdef = 6 Tdef-low = 4 |
| 7 | 3 seconds | Less than Tlw | Tdef = 7 Tdef-low = 5 |
| 8 | 4 seconds | Less than Tlw | |

Table III is an example of a non-defensive PLP case where Tup=30 and Tlw=6. Initially, the data storage device operates in the defensive PLP idle phase, but at PC 1, there is a PLP time recorded that is less than Tup, but greater than Tlw. Hence, the data storage device enters the defensive PLP detecting phase. Tdef moves to 1 from 0 while Tdef-low remains at 0. At PC 2, there is a PLP time that is below both Tup and Tlw. Hence, Tdef moves to 2 and Tdef-low moves to 1. At PC 3, there is a PLP time that is below Tup and Tlw. Hence, Tdef moves to 3 while Tdef-low moves to 2. At PC 4, there is a PLP time that is below Tup, yet above Tlw and therefore Tdef moves to 4 while Tdef-low remains at 2. In each of PC 5-8, there is a PLP time that is below both Tup and Tlw and thus Tdef increases by 1 at each PC and Tdef-low increased by 1 at each PC. The results of Table III are that there are 5 (i.e., N) times out of 8 (i.e., M) times where the PLP time is below Tlw. Additionally, for all 8 (i.e., M) times that PLP time is below Tup. Because Table III is set for an N out of M times with N equal to 5 and M equal to 9, the data storage device enters the defensive PLP state. It is to be understood that the numbers 5 and 9 are for exemplification purposes and that other numbers are contemplated.

Figure 5:
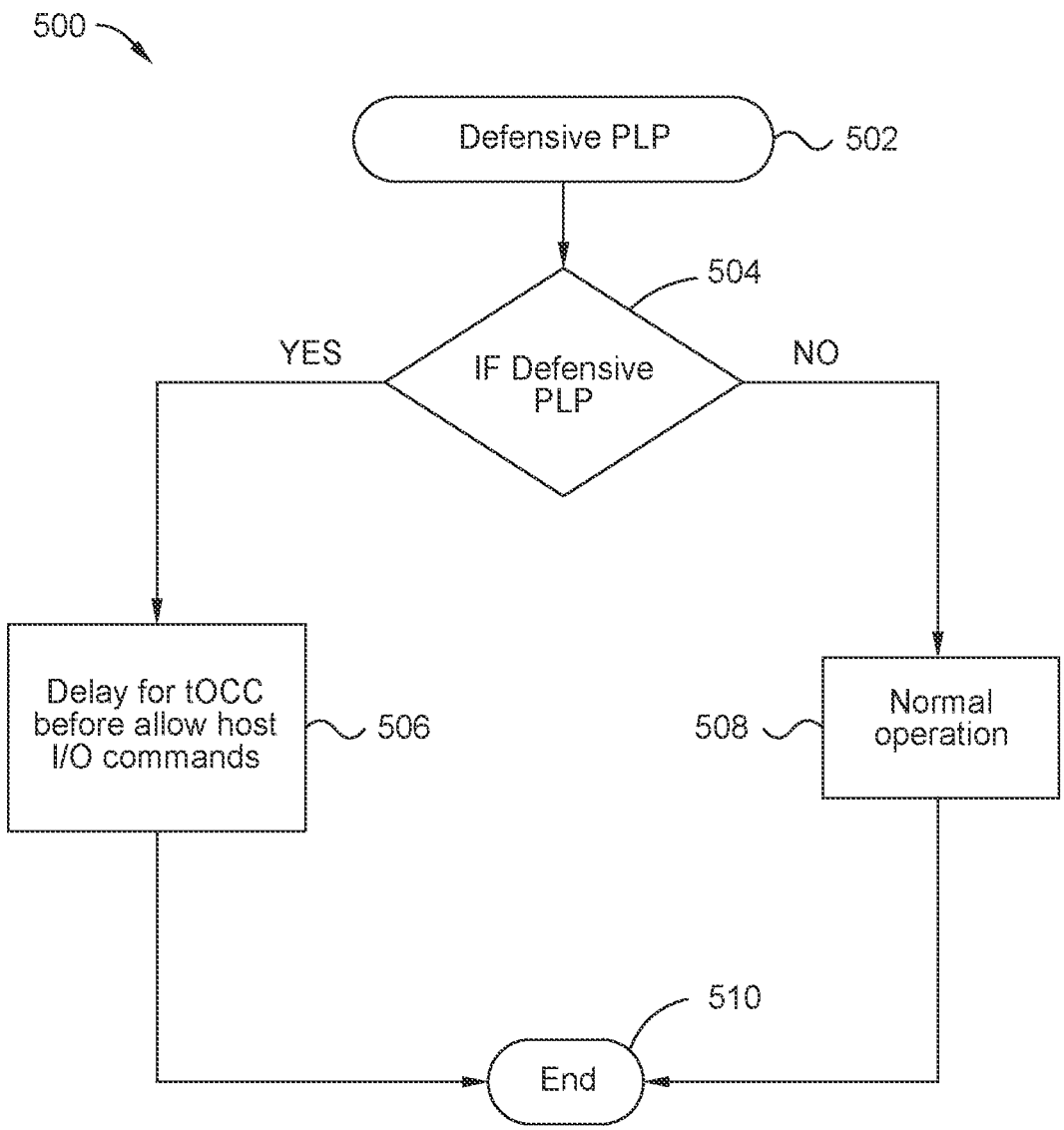
FIG. 5 is a flowchart illustrating processing of a power loss event according to another embodiment.

FIG. 5 is a flowchart 500 illustrating processing of a power loss event according to another embodiment. Initially, the data storage device operates in the defensive PLP state at 502. A determination is made at 504 regarding whether there is a defensive PLP event. If no at 504, then normal operation occurs at 508 and the process then ends at 510. If yes at 504, then there is a delay in informing the host device that the mount process has completed (i.e., delay tOCC) at 506 which thus prevents the host device from sending I/O commands. The process then ends at 510.

During the mount process, if the data storage device is detected to be in the Defensive PLP state, it is a fair assumption that the data storage device is facing a synthetic B2B PLP test and thus the data storage device may not have enough time to complete writing a block. Therefore, the data storage device will purposefully delay informing the host device of the mount complete, which in turn, delays host device I/O commands. Because the host device does not send any I/O commands to the data storage device, the data storage device does not have to write any host data to the memory device. The delay (e.g., 14 seconds in ZNS drives) will prevent the data storage device from losing a valuable PEC count while still abiding the mount time out (e.g., 20 seconds).

Figure 6:
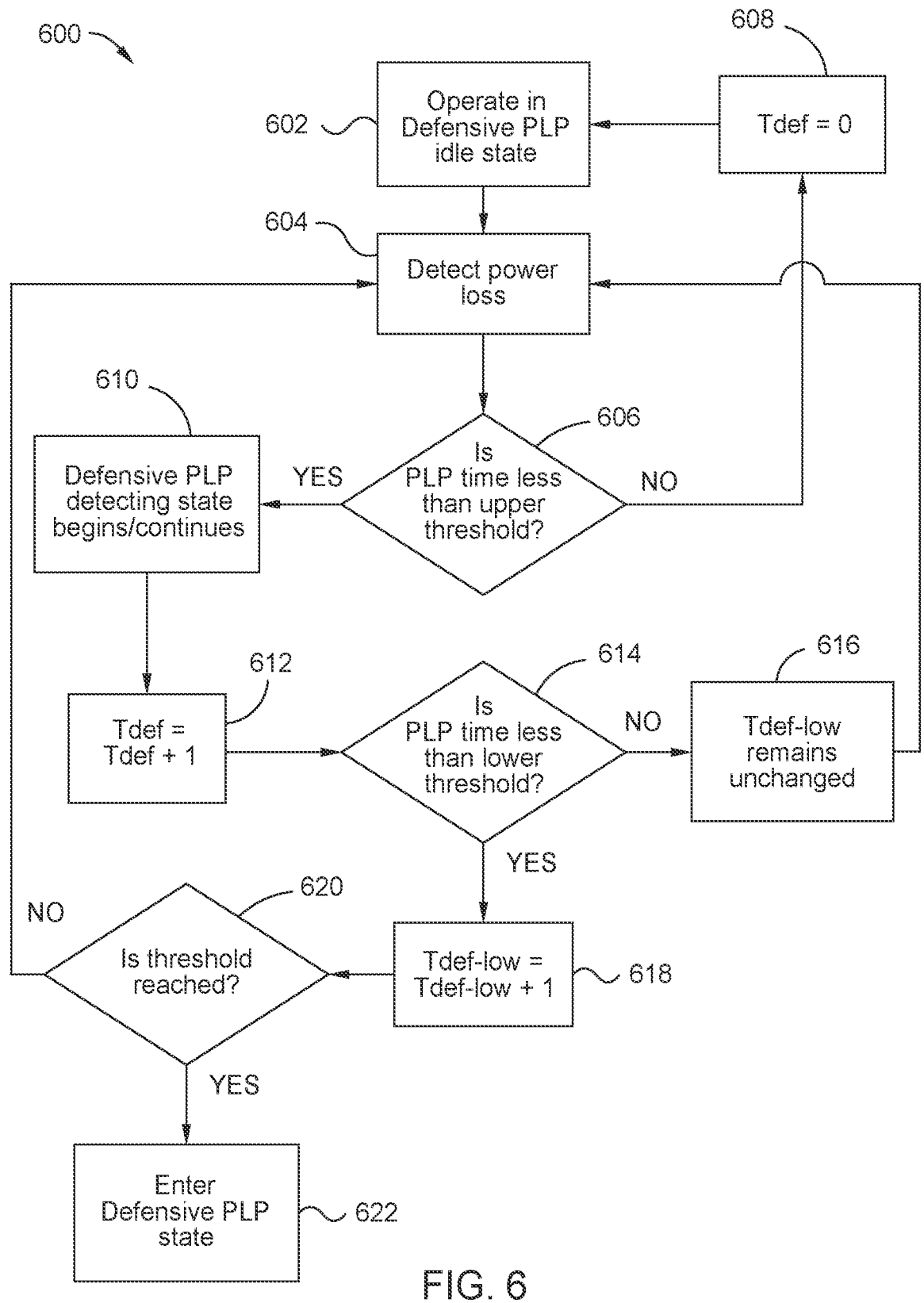
FIG. 6 is a flowchart illustrating processing of a power loss event according to another embodiment.

FIG. 6 is a flowchart 600 illustrating processing of a power loss event according to another embodiment. Initially, a data storage device operates in a defensive PLP idle state at 602 and then detects a power loss event at 604. A determination is then made regarding whether the PLP time is less than Tup at 606. If the PLP time is not less than Tup, then Tdef remains at 0 at 608 and the data storage device continues to operate in defensive PLP idle state at 602.

If, however, the PLP time is less than Tup at 606, then the data storage device enters defensive PLP detecting phase at 610 and Tdef is increased to Tdef+1 at 612. A determination is also made at 614 regarding whether the PLP time is less than Tlw. If the PLP time is not less than Tlw, then Tdef-low remains unchanged at 616 and the process continues by detecting the next power loss at 604 and continuing in defensive PLP detecting phase at 610 if the detected power loss at 604 has a PLP time that is less than the upper threshold at 606.

If the PLP time is less than Tlw at 614, then Tdef-low is increased to be equal to Tdef-low+1 at 618 and a determination is made regarding whether the threshold is reached at 620. The threshold may be N times that the PLP time is less than Tlw out of M consecutive times that the PLP time is less than Tup. If the threshold is reached, then the data storage device enters defensive PLP stage at 622. If the threshold is not reached at 620, then the process continues by detecting the next power loss at 604 and continuing in defensive PLP detecting phase at 610 if the detected power loss at 604 has a PLP time that is less than the upper threshold at 606.

Figure 7:
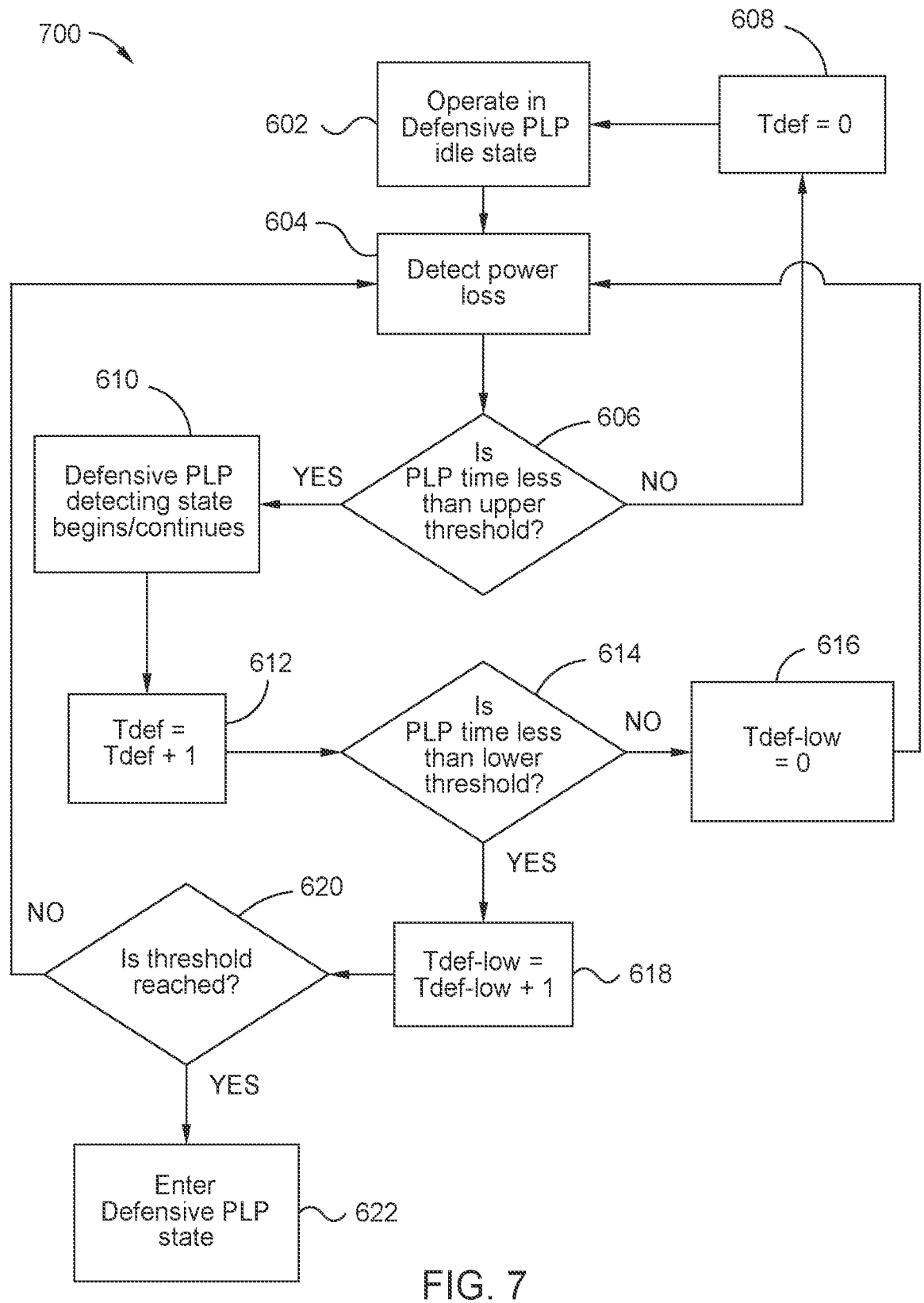
FIG. 7 is a flowchart illustrating processing of a power loss event according to another embodiment.

FIG. 7 is a flowchart 700 illustrating processing of a power loss event according to another embodiment. Flowchart 700 is identical to flowchart 600 except that when the PLP time is determined to not be less than Tlw at 614, Tdef-low is reset to 0 at 716. Additionally, if the PLP time is determined to be less than Tlw at 614 and Tdef-low is increased to Tdef-low+1 at 618, the threshold determination at 720 is whether a threshold number of consecutive PLP times below Tlw have been achieved. If yes at 720, then the data storage device enters the defensive PLP state at 622, but if no at 720, then the process continues by detecting the next power loss at 604 and continuing in defensive PLP detecting phase at 610 if the detected power loss at 604 has a PLP time that is less than the upper threshold at 606.

By tracking a number of times that a PLP time is below one or more thresholds, a synthetic PLP test is detected. Because the synthetic LP test is detected, a mount process is not completed until the synthetic PLP test is completed. Without completing the mount process, I/O commands from a host device are delayed and hence, unnecessary PCE counts are avoided and the lifetime of the data storage device is enhanced.

In one embodiment, a data storage device comprises: a controller configured to: set an upper back-to-back (B2B) power loss prevention (PLP) time threshold; set a lower B2B PLP time threshold; enter a defensive PLP detecting mode, wherein during defensive PLP detecting mode the controller is configured to: determine that PLP time is below the lower B2B PLP time threshold; and track a number of consecutive times that the PLP time is below the lower B2B PLP time threshold with a lower threshold tracker; and enter defensive PLP mode when the number of consecutive times is equal to a predetermined number. The defensive PLP detecting mode is entered upon determining that the PLP time is below the upper B2B PLP time threshold. The controller is further configured to track a number of consecutive times the PLP time is below the upper B2B PLP time threshold. The controller is configured to reset the lower threshold tracker upon determining the PLP time is at or above the lower B2B PLP time threshold. The controller is configured to track a number of times the PLP time is below the upper B2B PLP time threshold with an upper threshold tracker. The controller is configured to reset the upper threshold tracker upon determining the PLP time is at or above the upper B2B PLP time threshold. The controller is configured to reset the lower threshold tracker upon determining the PLP time is at or above the upper B2B PLP time threshold. The controller is configured to enter a defensive idle mode upon determining the PLP time is at or above the upper B2B PLP time threshold. The controller is configured to reset the lower threshold tracker upon determining the PLP time is above the lower B2B PLP time threshold. The data storage device is a zone namespace (ZNS) device.

In another embodiment, a data storage device comprises: a controller configured to: set an upper back-to-back (B2B) power loss prevention (PLP) time threshold; set a lower B2B PLP time threshold; enter a defensive PLP detecting mode, wherein during the defensive PLP detecting mode the controller is configured to: determine that the PLP time is below the lower B2B PLP time threshold; and track a number of times that the PLP time is below the lower B2B PLP time threshold with a lower threshold tracker; and enter a defensive PLP mode when the number of times is equal to a first number of times out of a second number of times, wherein the first number of times is less than the second number of times. The controller is configured to reset the lower threshold tracker upon determining the PLP time is at or above the upper B2B PLP time threshold. The first number is greater than half of the second number. The controller is configured to perform a mount process. The controller is configured to delay completing the mount process while in the defensive PLP mode. The data storage device is in defensive PLP idle mode prior to entering the defensive PLP detecting mode. The data storage device is a zone namespace (ZNS) device, wherein the first number of times is 5 times, and wherein the second number of times is 9 times.

In another embodiment, a data storage device comprises: a controller configured to: detect entry into a synthetic power loss prevention (PLP) test; track a PLP time; compare the PLP time to a lower back-to-back (B2B) PLP time threshold and an upper B2B PLP time threshold; switch between a defensive PLP idle state, a defensive PLP detecting state, and a defensive PLP state; and withhold completion of a mount process while in the defensive PLP state. Switching from the defensive PLP idle state to the defensive PLP detecting state occurs when the PLP time is below the upper B2B PLP time threshold. Switching from the defensive PLP detecting state and the defensive PLP state occurs when the PLP time is below the lower B2B PLP time threshold.

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:
   a controller configured to:
   set an upper back-to-back (B2B) power loss prevention (PLP) time threshold;
   set a lower B2B PLP time threshold;
   enter a defensive PLP detecting mode when a B2B PLP time is between the upper B2B PLP time threshold and the lower B2B PLP time threshold, wherein during defensive PLP detecting mode the controller is configured to:
   determine that PLP time is below the lower B2B PLP time threshold; and
   track a number of consecutive times that the PLP time is below the lower B2B PLP time threshold with a lower threshold tracker; and
   enter a defensive PLP mode when the number of consecutive times is equal to a predetermined number.

2. The data storage device of claim 1, wherein the defensive PLP detecting mode is entered upon determining that the PLP time is below the upper B2B PLP time threshold.

3. The data storage device of claim 1, wherein the controller is further configured to track a number of consecutive times the PLP time is below the upper B2B PLP time threshold.

4. The data storage device of claim 1, wherein the controller is configured to reset the lower threshold tracker upon determining the PLP time is at or above the lower B2B PLP time threshold.

5. The data storage device of claim 1, wherein the controller is configured to track a number of times the PLP time is below the upper B2B PLP time threshold with an upper threshold tracker.

6. The data storage device of claim 5, wherein the controller is configured to reset the upper threshold tracker upon determining the PLP time is at or above the upper B2B PLP time threshold.

7. The data storage device of claim 6, wherein the controller is configured to reset the lower threshold tracker upon determining the PLP time is at or above the upper B2B PLP time threshold.

8. The data storage device of claim 5, wherein the controller is configured to enter a defensive idle mode upon determining the PLP time is at or above the upper B2B PLP time threshold.

9. The data storage device of claim 1, wherein the controller is configured to reset the lower threshold tracker upon determining the PLP time is above the lower B2B PLP time threshold.

10. The data storage device of claim 1, wherein the data storage device is a zone namespace (ZNS) device.

11. A data storage device, comprising:
a controller configured to:
set an upper back-to-back (B2B) power loss prevention (PLP) time threshold;
set a lower B2B PLP time threshold;
enter a defensive PLP detecting mode when a B2B PLP time is between the upper B2B PLP time threshold and the lower B2B PLP time threshold, wherein during the defensive PLP detecting mode the controller is configured to:
determine that the PLP time is below the lower B2B PLP time threshold; and
track a number of times that the PLP time is below the lower B2B PLP time threshold with a lower threshold tracker; and
enter a defensive PLP mode when the number of times is equal to a first number of times out of a second number of times, wherein the first number of times is less than the second number of times.

12. The data storage device of claim 11, wherein the controller is configured to reset the lower threshold tracker upon determining the PLP time is at or above the upper B2B PLP time threshold.

13. The data storage device of claim 11, wherein the first number is greater than half of the second number.

14. The data storage device of claim 11, wherein the controller is configured to perform a mount process.

15. The data storage device of claim 14, wherein the controller is configured to delay completing the mount process while in the defensive PLP mode.

16. The data storage device of claim 11, wherein the data storage device is in a defensive PLP idle mode prior to entering the defensive PLP detecting mode.

17. The data storage device of claim 11, wherein the data storage device is a zone namespace (ZNS) device, wherein the first number of times is 5 times, and wherein the second number of times is 9 times.

18. A data storage device, comprising:
a controller configured to:
detect entry into a synthetic power loss prevention (PLP) test;
track a PLP time;
compare the PLP time to a lower back-to-back (B2B) PLP time threshold and an upper B2B PLP time threshold;
switch between a defensive PLP idle state, a defensive PLP detecting state, and a defensive PLP state;
enter the defensive PLP detecting when a B2B PLP time is between the upper B2B PLP time threshold and the lower B2B PLP time threshold; and
withhold completion of a mount process while in the defensive PLP state.

19. The data storage device of claim 18, wherein switching from the defensive PLP idle state to the defensive PLP detecting state occurs when the PLP time is below the upper B2B PLP time threshold.

20. The data storage device of claim 19, wherein switching from the defensive PLP detecting state and the defensive PLP state occurs when the PLP time is below the lower B2B PLP time threshold.

* * * * *